United States Patent [19]

Kojima

[11] Patent Number: 5,038,313

[45] Date of Patent: Aug. 6, 1991

[54] FLOATING-POINT PROCESSOR PROVIDED WITH HIGH-SPEED DETECTOR OF OVERFLOW AND UNDERFLOW EXCEPTIONAL CONDITIONS

[75] Inventor: Shingo Kojima, Tokyo, Japan

[73] Assignee: NEC Corporation, Tokyo, Japan

[21] Appl. No.: 472,387

[22] Filed: Jan. 31, 1990

[30] Foreign Application Priority Data

Jan. 31, 1989 [JP] Japan ................................ 1-22227

[51] Int. Cl.⁵ ............................ G06F 7/00; G06F 7/38
[52] U.S. Cl. .................................. 364/736.5; 364/748; 364/745
[58] Field of Search ....................... 364/736.5, 745, 748

[56] References Cited

U.S. PATENT DOCUMENTS 4,562,553 12/1985 Mattedi et al. ....................... 364/745
4,768,160 8/1988 Yokoyama ........................... 364/745
4,779,220 10/1988 Nukiyama ......................... 364/745 X
4,796,217 1/1989 Takahashi et al. .................. 364/745

Primary Examiner—Dale M. Shaw
Assistant Examiner—Tan V. Mai
Attorney, Agent, or Firm—Foley & Lardner

[57] ABSTRACT

A processor includes an exception detector for receiving floating-point data on which a rounding operation is to be performed. The exception detector detects whether or not an overflow or an underflow exception occurs in floating-point data without using output floating-point data obtained by performing a rounding operation on the input floating-point data. The exception detector includes a flag indicating the type of rounding operation to be performed and an adder which unconditionally performs a rounding operation by raising a mantissa part of input floating-point data. An exponent detector evaluates an exponent part of the input floating-point data to set flags indicative of the exponent. A circuit produces overflow or underflow exception signals based on the flags and an output from the adder.

9 Claims, 7 Drawing Sheets

| Exponent Part Data | Output of Detector 205 |
|---|---|
| Greater than Valid Maximum Number | 011 |
| Equal to Valid Maximum Number | 010 |
| Equal to Zero | 000 |
| Negative Number | 111 |
| Other Numbers | 001 |

FIG. 3A

| Address Data | | | Overflow Signal 213 | Underflow Signal 214 |
|---|---|---|---|---|
| Out of 105 | OVF Bit of 109 | Out of 110 | | |
| 0 0 0<br>0 0 0<br>0 0 0<br>0 0 0 | 0<br>0<br>1<br>1 | 0<br>1<br>0<br>1 | 0<br>0<br>0<br>0 | 1<br>1<br>1<br>0 |
| 0 0 1<br>0 0 1<br>0 0 1<br>0 0 1 | 0<br>0<br>1<br>1 | 0<br>1<br>0<br>1 | 0<br>0<br>0<br>0 | 0<br>0<br>0<br>0 |
| 0 1 0<br>0 1 0<br>0 1 0<br>0 1 0 | 0<br>0<br>1<br>1 | 0<br>1<br>0<br>1 | 0<br>0<br>0<br>1 | 0<br>0<br>0<br>0 |
| 0 1 1<br>0 1 1<br>0 1 1<br>0 1 1 | 0<br>0<br>1<br>1 | 0<br>1<br>0<br>1 | 1<br>1<br>1<br>1 | 0<br>0<br>0<br>0 |
| 1 0 0<br>1 0 0 | 0<br>0 | 0<br>1 | 0<br>0 | 0<br>0 |
| 1 1 0<br>1 1 0 | 1<br>1 | 0<br>1 | 0<br>0 | 0<br>0 |
| 1 1 1<br>1 1 1<br>1 1 1<br>1 1 1 | 0<br>0<br>1<br>1 | 0<br>1<br>0<br>1 | 0<br>0<br>0<br>0 | 1<br>1<br>1<br>1 |

FIG. 3B

| Designated Rounding Mode | SB 0:Positive 1:Negative | LSB | RB | STB | OR % RB & STB | Output 1081 1: Raising 0: Trancating |
|---|---|---|---|---|---|---|
| Rounding toward 0 | x | x | x | x | — | 0 |
| Rounding toward +00 | 0<br>0<br>1 | 0<br>0<br>x | —<br>—<br>x | —<br>—<br>x | 1<br>0<br>— | 1<br>0<br>0 |
| Rounding toward −00 | 0<br>1<br>1 | x<br>x<br>x | x<br>—<br>— | x<br>—<br>— | —<br>1<br>0 | 0<br>1<br>0 |
|  | x<br>x<br>x<br>x<br>x<br>x<br>x<br>x | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | —<br>—<br>—<br>—<br>—<br>—<br>—<br>— | 0<br>0<br>0<br>1<br>0<br>0<br>1<br>1 | x ··· Don't Care

FIG. 4

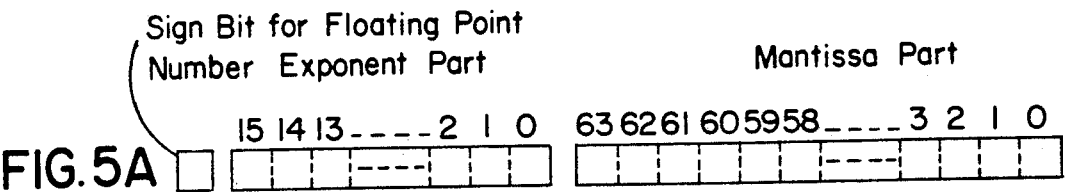
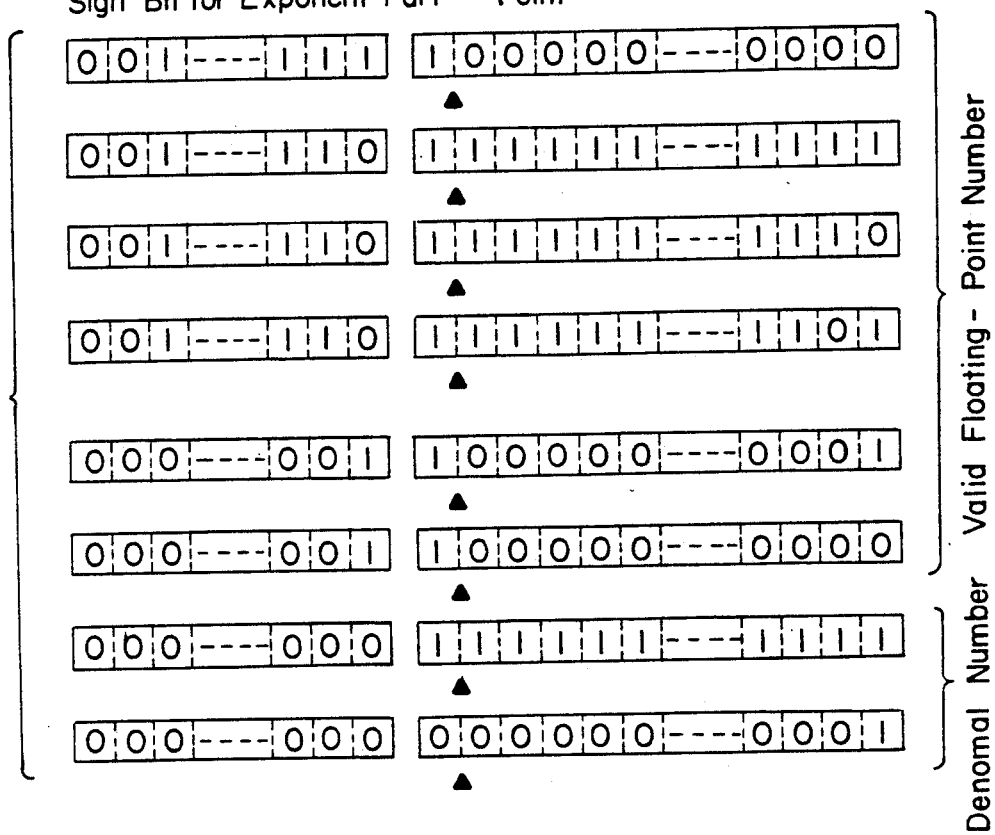
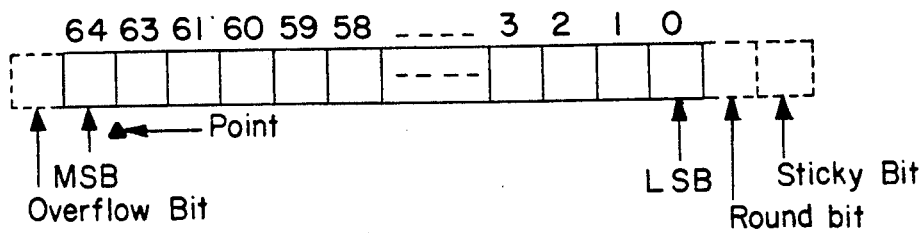

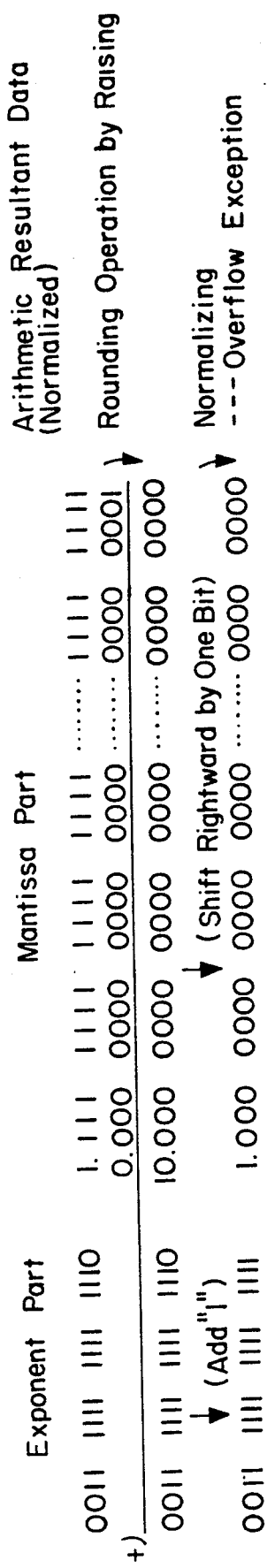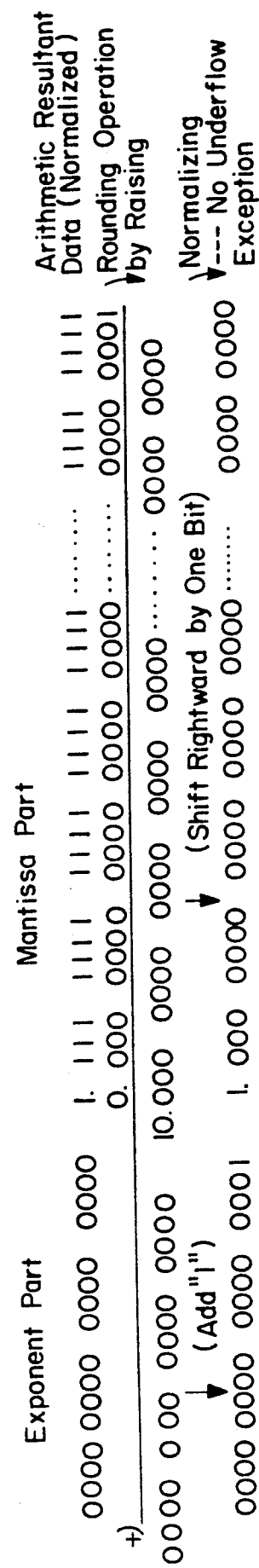

FLOATING-POINT PROCESSOR PROVIDED WITH HIGH-SPEED DETECTOR OF OVERFLOW AND UNDERFLOW EXCEPTIONAL CONDITIONS

BACKGROUND OF THE INVENTION

The present invention relates to a microprocessor for performing an arithmetic operation on floating-point data and, more particularly, to a floating-point processor (called hereinafter "FPP") including an exception detector for detecting the occurrence of "Overflow" and "Underflow" exceptions in arithmetic resultant data.

As well known in the art, floating-data is represented by an exponent part and a mantissa part. For example, the exponent part consists of 16 bits and the mantissa part consists of 64 bits, as shown in FIG. 5A. The exponent part data is represented by 2's complement form and thus the most significant (or 15-th) bit (MSB) thereof indicates a sign of the exponent part data. The secondary more significant (or 14-th) bit of the exponent part data is used as an expanded bit for indicating an overflow condition of the actual exponent number represented by the remaining fourteen bits. A sign bit is further provided to indicate a sign of the floating-point data. Moreover, the floating-point data is treated in a normalized form. The normalized form indicates that the most significant (or 63-th) bit (MSB) of the mantissa part is "1", as also shown in FIG. 5A. The point of the mantissa part exists between the MSB and the secondary more significant (or 62-th) bit thereof.

In this data format, as shown in FIG. 5B, the normalized floating-point data is represented as a valid number if it is within a range from the data representing a valid floating-point maximum number, in which all the bits except the most significant two bits and the LSB of the exponent part and all the bits of the mantissa part are "1", to the data representing a valid floating-point minimum number, in which only the LSB of the exponent part and only the LSB of the mantissa part are "1". As also shown in FIG. 5B, the data in which the exponent part thereof is greater than the valid maximum number of the exponent part, i.e. all the bits except the most significant two bits are "1" or the expanded bit is "1", is defined as a mark representing infinity or uncertainty. The data in which all the bits of the exponent part are "0" is treated as a denormal number for interpolating between zero and the valid floating-point minimum number (the exponent part being 1 and only the MSB of the mantissa part being "1"). The data in which the MSB of the exponent part is "1" is defined as a default number.

When an arithmetic operation is performed on data according to the above data format, the resultant data often exceeds the range represented as the normalized valid number. The data having the exponent part data which is larger than the valid maximum number is called "Overflow" data, and the data having the exponent part data which is smaller than the valid minimum number is called "Underflow" data. As also well known in the art, the occurrence of Overflow and Underflow data is detected as an exception. Therefore, a detecting operation has to be performed for detecting whether or not Overflow or Underflow occurs in the arithmetic resultant data. For this purpose, the exponent part of the resultant data is detected. That is, when all the bits except the two most significant bits of the exponent part of the resultant data are "1", the Overflow exception is detected. When the exponent part of the resultant data is equal to or smaller than zero, the Underflow exception is detected.

However, the data of the exponent part may be changed by a rounding operation which is performed on the resultant data. More specifically, in the arithmetic operation of the floating-point data, the mantissa part of the resultant data often exceeds a predetermined data length (64 bits in the data format shown in FIG. 5). For example, in the case of the multiplication of the floating-point data, the mantissa part of the multiplication resultant data may have a data length twice longer than the predetermined data length. Therefore, an operation for adjusting the data length of the resultant data with the predetermined data length is required to complete the processing. This operation is called "rounding operation". Four rounding modes for the rounding operation, i.e. "rounding toward $+\infty$", "rounding toward $-\infty$", "rounding toward zero" and "rounding to nearest", are known. However, the rounding operation includes only two cases. The first case is to raise one unit to the place of the LSB of the mantissa part and the second case is to truncate the value underflowing LSB thereof. That is, the rounding operation is summarized as modifying the arithmetic resultant data by adding "1" to the LSB of the mantissa part or by truncating the underflowing value, depending upon the rounding modes and the resultant data. In order to determine the rounding operation by raising or truncating, the mantissa part of the resultant data is added with a round bit and a sticky bit, as shown in FIG. 5C. The round bit represents the data of the most significant bit of the underflowing value and the sticky bit represents the logic-ORed data of the underflowing value except the MSB thereof. In accordance with contents of the sign bit, the LSB of the mantissa part, the round bit and the sticky bit and the designated rounding mode, the rounding operation by raising or truncating is determined. When rounding by raising, the mantissa part of the resultant data is added with "1". As a result, an overflow bit may be produced from the mantissa part, as shown in FIG. 5C. In this case, the exponent part of the resultant data is added with "1" and the mantissa part thereof is shifted by one in the direction of the LSB in order to normalize the resultant data subjected to the rounding operation. Thus, the exponent part data of the resultant data may be changed by the rounding operation.

For example, assuming that all the bits except the most significant two bits and the LSB of the exponent part of the normalized resultant data are "1" and all the bits of the mantissa part thereof are "1" as shown in FIG. 6A, the exponent part data is a valid maximum number and thus no Overflow exception occurs in this data. However, if the rounding operation by raising is designated and performed, an overflow bit is produced from the mantissa part, so that the normalized data exceeds the valid maximum number. This means the occurrence of the Overflow exception. As another example shown in FIG. 6B, when all the bits of the exponent part of the resultant data are "0" and all the bits of the mantissa part thereof are "1", this resultant data is the denormal number and thus the Underflow exception occurs therein. However, if the rounding operation by raising is designated and performed, an overflow bit is produced from the mantissa part, so that the normalized data is free from the Underflow exception.

Thus, since the exponent part data may be changed by the rounding operation, the exception detector according to the prior art performs the exception detecting operation on the normalized exponent part data. In order to obtain the normalized exponent part data, such a sequential operation is required that the mantissa part data is first added with "1" if the rounding operation by raising is designated and thereafter the exponent part data is added with "1" if the overflow bit is produced from the mantissa part. For this reason, the exception detecting operation is not preformed at a high speed.

SUMMARY OF THE INVENTION

Therefore, an object of the present invention is to provide an improved exception detector for a microprocessor performing a floating-point arithmetic operation.

Another object of the present invention is to provide an FPP including a high-speed exception detector for detecting the occurrence of Overflow and Underflow exceptions.

A processor according to the present invention includes an exception detector for detecting whether or not Overflow and Underflow exceptions occur in floating-point data subjected to a rounding operation, the exception detector comprising a first detector for detecting whether the rounding operation to be performed is a rounding operation by raising or a rounding operation by trancating, a unit for unconditionally performing the rounding operation by raising a mantissa part of the floating-point data to provide a modified mantissa part, a second detector for detecting a number of an exponent part of the floating-point data, and an exception detection circuit receiving the detection outputs from the first and second detector and overflow data of the modified mantissa part and responding thereto to detect whether or not the Overflow or Underflow exception occurs in the floating-point data subjected to the rounding operation.

Considering the floating-point data shown in FIG. 6A, the detection output of the first detector represents that the rounding operation to be performed is the rounding operation by raising and the overflow data of the modified mantissa part from the unit indicates the production of the overflow bit. The output of the second detector represents that the number represented by the exponent part data is equal to the valid maximum number. Accordingly, the exception detection circuit responds to those three data and produces a detection output representing the occurrence of the Overflow exception. Similarly, no Underflow exception is detected in the data shown in FIG. 6. Since the first and second detectors and the unit can operate simultaneously, the exception detector detects the occurrence of the Overflow exception at a high-speed.

BRIEF DESCRIPTION OF THE DRAWINGS

The above and other objects, advantages and features of the present invention will be more apparent from the following description taken in conjunction with the accompanying drawing, in which

FIGS. 3A and 3B are diagrams representative of a relationship between input and output data of an exponent part detector and Overflow/Underflow detection ROM shown in FIG. 2;

FIG. 4 is a diagram representative of a relationship between input and output data of a rounding operation detector shown in FIGS. 1 and 2;

FIGS. 5A to 5C are data format diagrams representative of floating-point data; and FIGS. 6A and 6B are diagrams for describing exception occurrence and no-exception occurrence in floating-point data, respectively.

DETAILED DESCRIPTION OF THE EMBODIMENTS

Figure 1:
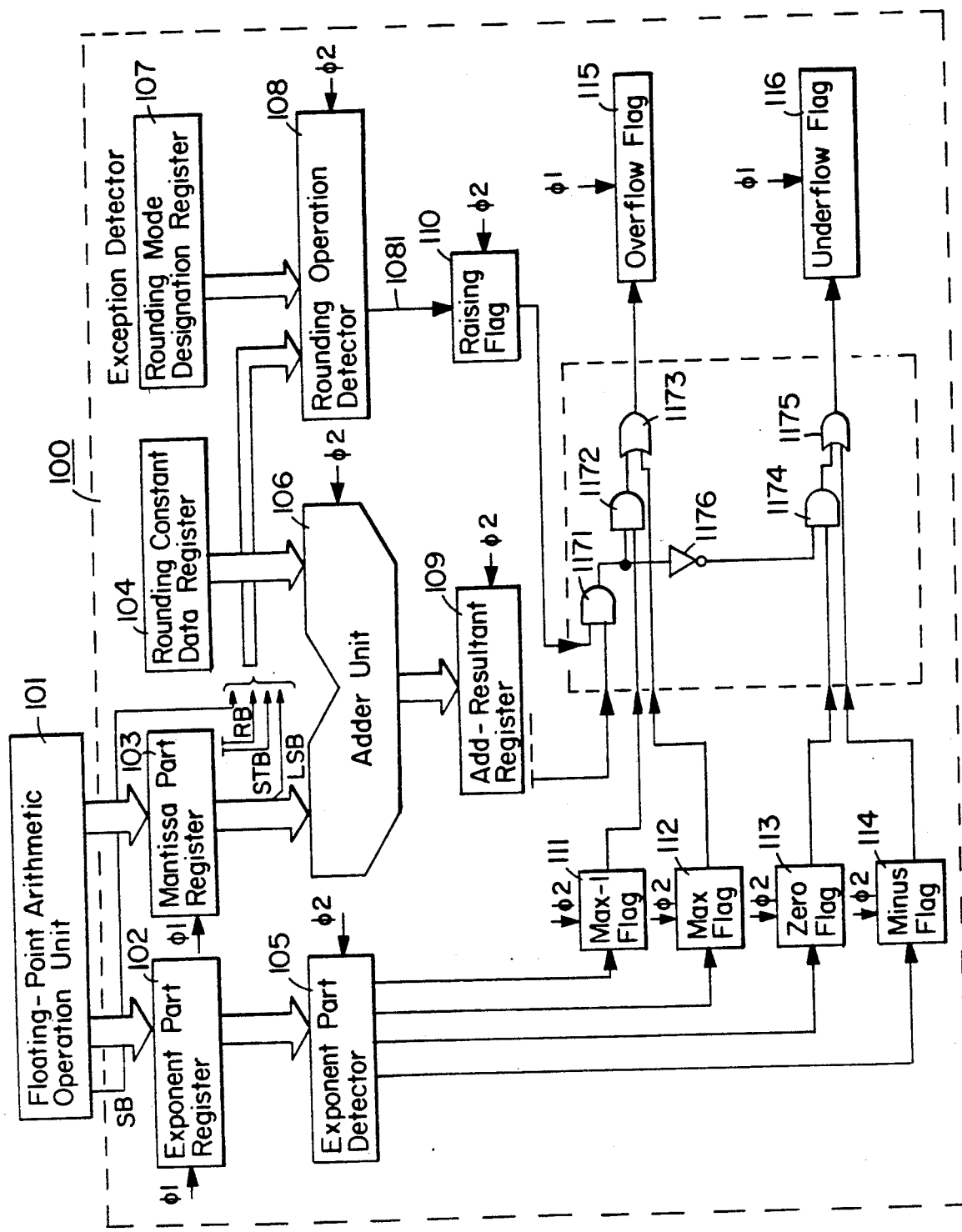
FIG. 1 is a block diagram representative of an exception detector adopted in a FPP according to an embodiment of the present invention.

Referring to FIG. 1, an exception detector 100 according to an embodiment of the present invention includes an exponent part register 102 and a mantissa part register 103 for temporarily storing exponent part data and mantissa part data of floating-point data outputted from a floating-point arithmetic operation unit 101, respectively. The register 103 also stores the round bit and sticky bit added to the mantissa part data shown in FIG. 5C. The unit 101 also outputs the sign bit SB representing the sign of the floating-point data. The exponent part data stored in the register 102 is supplied to an exponent part detector 105 which, in turn, detects whether the exponent part data is larger than the valid maximum number, or is equal to the valid maximum number, or is zero, or is a negative number. This detector 105 can be consituted of gate circuits. When the exponent part data is detected to be larger than the valid maximum number, a MAX flag 111 is set to logic 1. When the exponent part data is equal to the valid maximum number, a MAX-1 flag 112 is set to logic 1. Similarly, a zero flag 113 and a minus flag 114 are set to logic 1 when the exponent part data is zero and a negative number, respectively. The mantissa part data stored in the register 103 (64-bit data in the data format shown in FIG. 5) is supplied to a first set of input terminals of a mantissa part adder unit 106 which has a second set of input terminals supplied with rounding constant data 104. This constant data has the same bit-length as the mantissa part data and only the LSB thereof is "1" with all the remaining bits being "0". The adder unit 106 performs an adding operation on the mantissa part data and the rounding constant data. Namely, the unit 106 unconditionally performs the rounding operation by raising the mantissa part data. The output from the adder unit 106 is temporarily stored in a register 109 along with overflow bit data thereof. The round bit (RB) and sticky bit (STB) stored in the register 103 are supplied to a rounding operation detector 108 together with the sign bit (SB) from the unit 101 and the LSB of the mantissa part data. The detector 108 further receives rounding mode designation data 107. In response to this data, the detector 108 detects whether the rounding operation to be performed is a rounding operation by raising or a rounding operation by truncating and outputs a detection output 1081 in accordance with FIG. 4. Logic 1 of this output 1081 indicates the rounding operation by raising and logic 0 thereof indicates the rounding operation by truncating. A raising flag 110 is set to logic 1 by the logic 1 output 1081, i.e. by the indication of the rounding operation by raising.

The data of the respective flags 110 to 114 and the overflow bit data of the register 109 are supplied to an Overflow/Underflow detection circuit 117. This circuit 117 includes three AND gates 1171, 1172 and 1174, one inverter 1176 and two OR gates 1173 and 1175. The AND gate 1171 receives the data of the flag 110 and the overflow bit data of the register 109 and the output thereof is supplied to the AND gate 1172 along with the data of the MAX-1 flag 111. The OR gate 1173 receives the output of the AND gate 1172 and the data of the MAX flag 112 and the output of OR gate 1173 is used to control an Overflow flag 115. The AND gate 1174 receives the data of the zero flag 113 and the output of the inverter 1176 receiving the output of the AND gate 1171. The OR gate 1175 receives the output of the AND gate 1174 and the data of the minus flag 114 and controls an Underflow flag 116.

The exception detector 100 operates under two-phase clock control consisting of first and second clocks $\phi 1$ and $\phi 2$. In synchronism with the first clock $\phi 1$, the registers 102 and 103 fetch the exponent part and mantissa part of the floating-point data from the unit 101, respectively, and the flags 115 and 116 fetch the outputs of the detection circuit 117. In synchronism with the second clock $\phi 2$, the detectors 105 and 108 and the adder unit 106 perform the respective operations in parallel to one another.

In operation, assuming that the floating-point arithmetic operation unit 101 outputs the floating-point data shown in FIG. 6A, the exponent and mantissa parts thereof are stored in the registers 102 and 103 by the first clock $\phi 1$, respectively. Since the exponent part data stored in the register 102 is equal to the valid maximum number, the MAX-1 flag 111 is set to logic 1 by the exponent part detector 105 in synchronism with the second clock $\phi 2$. Also in this clock $\phi 2$, the adder unit 106 unconditionally performs the rounding operation by raising on the mantissa part stored in the register 103, so that the overflow bit data of the register 106 is set to logic 1. Further in the second clock $\phi 2$, the detector 108 detects the rounding operation to be performed and controls the flag 110. In this description, since the rounding operation by raising is designated, the flag 110 is set to logic 1.

Since all the data signal necessary for the detection circuit 117 are ready in the second clock cycle $\phi 1$, the detection circuit 117 starts to detect the occurrence of Overflow and Underflow exceptions immediately. In the present description, the flags 110 and 111 are set to logic 1 and the overflow bit of the register 109 is set logic 1, so that the overflow flag 115 is set to logic 1. Thus, the occurrence of the Overflow exception is detected without evaluating the normalized exponent part data which is required for the prior art.

If the rounding operation detection circuit 108 produces a logic 0 output 1081 (i.e., the rounding operation by truncating is designated) or if the exponent part data is smaller than the valid maximum number, the flag 110 or flag 111 is reset to logic 0, so that the overflow flag 115 is reset to logic 0. When the exponent part data stored in the register 102 is larger than the valid maximum number, the MAX flag 112 is set to logic 1, so that the overflow flag 115 is set to logic 1 irrespective of data of the flags 110 and 111 and the overflow bit data of the register 109.

When the unit 101 outputs the floating-point data shown in FIG. 6B, the zero flag 113 is set to logic 1. The overflow bit data of the register 109 and the flag 110 are also set to logic 1 in this description. The AND gate 1171 thus outputs logic 1. However, the inverter 1176 inverts the output of the AND gate 1171 and thus supplies logic 0 to the AND gate 1174. As a result, the underflow flag 116 is reset to logic 0. Thus, no occurrence of the Underflow exception is detected when the floating-point data shown in FIG. 6B is subjected to the rounding operation by raising. If the detector 108 detects that the rounding operation to be performed is truncation or the overflow bit data of the register 109 takes logic 0, the underflow flag 116 is set to logic 1 to indicate the occurrence of an Underflow exception. When the exponent part is a negative number, the minus flag 114 is set to logic 1, so that the underflow flag 116 is set to logic 1 irrespective of data of the flag 110 and the overflow bit data of the register 109.

Figure 2:
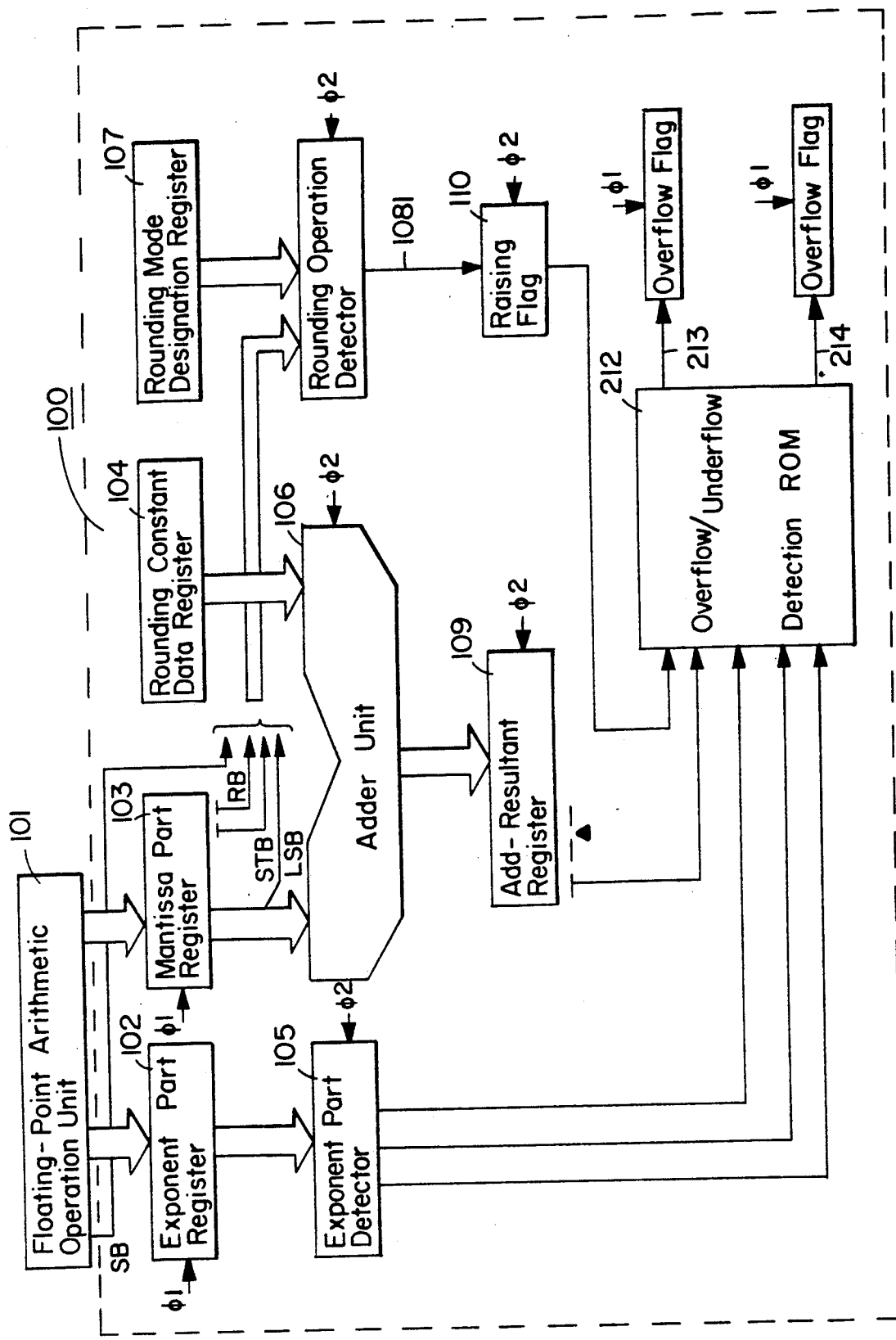
FIG. 2 is a block diagram representative of an exception detector adopted in a FPP according to another embodiment of the present invention.

The detection circuit 117 can be constituted of a memory in place of a logic gate circuit. Such a construction is shown in FIG. 2 as another embodiment of the present invention, in which the same constituents as those shown in FIG. 1 are denoted by the same reference numerals to omit the further description thereof. In FIG. 2, an overflow/underflow detection ROM (Read Only Memory) 212 is provided. Addresses for ROM 212 are obtained by combining data from an exponent part detector 205, the overflow bit data of the register 109 and the data of the flag 110. The detector 205 responds to the exponent part data and outputs 3-bit data in accordance with the relationship shown in FIG. 3A. That is, when the exponent part data is larger than the valid maximum number, 3-bit data takes a value of "011". When the exponent part data is equal to the valid maximum number, 3-bit data of "010" is derived. Similarly, data of "000" and "111" are derived when the exponent part data is zero and a negative number, respectively. With respect to other numbers of the exponent part data, the data of "001" is derived from the detector 105. The detector 105 can be easily constituted of the combination of logic gates or also a memory. The output of the detector 105 is supplied to ROM 212 as more significant 3-bit address data. The data of the flag 110 is supplied to ROM 212 as the least significant bit address data, and the data of the overflow bit of the register 109 is supplied to ROM 212 as an intermediate significant bit address data. ROM 212 responds to address data thus supplied and produces Overflow and Underflow signals 213 and 214 to control flags 115 and 116 in accordance with the relationship shown in FIG. 3B. Also in this embodiment, the exception detection for Overflow and Underflow occurrence is performed at a high speed.

The present invention is not limited to the above embodiments, but may be modified and changed without departing from the scope and spirit of the invention.

What is claimed is:

1. A processor comprising:
an exception detector receiving input floating-point data on which a rounding operation is to be performed and detecting, without using output floating-point data which is obtained by performing a rounding operation on said input floating-point data, whether or not an overflow or an underflow exception occurs in said output floating-point data, said exception detector including first means for producing first data indicating whether a rounding operation to be executed is a rounding operation by raising or a rounding operation by truncating, second means for unconditionally performing a rounding operation by raising a mantissa part of said input floating-point data to provide a modified mantissa part having overflow data, third means for evaluating an exponent part of said input floating-point data to produce second data taking a first state when said exponent part is a valid maximum number and taking a second state when said exponent part is zero, and fourth means, responsive to said first data, said second data and said overflow data, for producing detection data indicating whether or not said overflow or said underflow exception occurs in said output floating-point data subjected to said rounding operation.

2. A processor as claimed in claim 1, wherein at least said first, second, and third means operate substantially in parallel to one another.

3. A processor as claimed in claim 1, wherein said fourth means produces detection data representing occurrence of said overflow exception in said output floating-point data when said first data indicates that said rounding operation to be executed is said rounding operation by raising and when said second data takes said first state and when said overflow data indicates that an overflow is produced in said modified mantissa part.

4. A processor as claimed in claim 1, wherein said fourth means produces detection data indicating occurrence of said underflow exception in said output floating-point data when said second data takes said second state and when said first data indicates that said rounding operation to be executed is said rounding operation by truncation or said overflow data indicates that no overflow is produced in said modified mantissa part.

5. A processor as claimed in claim 1, wherein said first means includes means for temporarily storing mode data for designating a rounding operation and means for determining a content of said first data in response to said mode data and at least one part of said mantissa part.

6. A floating-point data processor comprising:

an exception detector receiving input floating-point data on which a rounding operation is to be performed and detecting whether or not an overflow or an underflow exception occurs in output floating-point data which is obtained by performing a rounding operation on said input floating-point data, said exception detector including storage means for temporarily storing mode data for designating a rounding operation;

first means responsive to said mode data and to at least one part of a mantissa part of said input floating-point data, said first data taking a first state when a rounding operation by raising is determined to be performed and a second state when a rounding operation by truncating is determined to be performed;

second means for incrementing said mantissa part of said input floating-point data to produce a modified mantissa part having overflow data, said overflow data taking a third state when an overflow occurs in said modified mantissa part and a fourth state when no overflow occurs in said modified mantissa part;

third means for evaluating an exponent part of said input floating-point data to produce second data, said second data taking a fifth state when said exponent part is a valid maximum number, a sixth state when said exponent part is zero, a seventh state when said exponent part is larger than said valid maximum number and an eighth state when said exponent part is a negative number;

a first terminal from which a first signal is generated to indicate occurrence of said overflow exception in said output floating-point data;

a second terminal from which a second signal is generated to indicate occurrence of said underflow exception in said output floating-point data; and a logic gate circuit supplied with said first, second and third data for detecting whether or not said overflow or said underflow exception occurs in said output floating-point data, said logic gate circuit generating said first signal at said first terminal when said overflow exception occurs and said second signal at said second terminal when said underflow exception occurs.

7. A processor as claimed in claim 6, wherein said first signal is generated by said logic gate circuit when said first data takes said first state and said overflow data takes said third state and said second data takes said fifth state, or when said second data takes said seventh state.

8. A processor as claimed in claim 6, wherein said second signal is generated by said logic gate circuit when said second data takes said sixth state and said first data takes said second state or said overflow data takes said fourth state, or when said second data takes said eighth state.

9. A floating-point data processor comprising:

an exception detector receiving input floating-point data on which a rounding operation is to be performed and detecting whether or not an overflow or an underflow exception occurs in output floating-point data which is obtained by performing a rounding operation on said input floating-point data, said exception detector including storage means for temporarily storing mode data for designating a rounding operation;

first means responsive to said mode data and at least one part of a mantissa part of said input floating-point data for producing first data for determining a rounding operation to be performed on said input floating-point data, said first data taking a first state when a rounding operation by raising is determined to be performed and a second state when a rounding operation by truncating is determined to be performed;

second means for incrementing said mantissa part of said input floating-point data to produce a modified mantissa part having overflow data, said overflow data taking a third state when an overflow occurs in said modified mantissa part and a fourth state when no overflow occurs in said modified mantissa part;

third means for evaluating an exponent part of said input floating-point data to produce second data, said second data taking a fifth state when said exponent part is a valid maximum number, a sixth state when said exponent part is zero, a seventh state when said exponent part is larger than said valid maximum number and an eighth state when said exponent part is a negative number;

a first terminal from which a first signal is generated to indicate occurrence of said overflow exception in said output floating-point data;

a second terminal from which a second signal is generated to indicate occurrence of said underflow exception in said output floating-point data;

a memory circuit having a plurality of storage locations;

means for combining said first, second and third data to supply combined data to said memory circuit as address data, said memory circuit reading out contents from a storage location accessed by said address data;

means responsive to a content read out of said memory circuit for generating said first signal at said first terminal when said content represents the occurrence of said overflow exception; and means responsive to a content read out of said memory circuit for generating said second signal at said second terminal when said content represents occurrence of said underflow exception.

* * * * *